United States Patent
Sasaki

(10) Patent No.: US 8,322,933 B2
(45) Date of Patent: Dec. 4, 2012

(54) OPTICAL CONNECTION STRUCTURE BETWEEN OPTICAL BACKPLANE AND CIRCUIT SUBSTRATE

(75) Inventor: Junichi Sasaki, Minato-ku (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/534,622

(22) Filed: Aug. 3, 2009

(65) Prior Publication Data
US 2009/0310922 A1 Dec. 17, 2009

Related U.S. Application Data

(62) Division of application No. 11/543,140, filed on Oct. 5, 2006, now Pat. No. 7,585,119.

(30) Foreign Application Priority Data

Oct. 6, 2005 (JP) ................................ 2005-293767

(51) Int. Cl.
*G02B 6/36* (2006.01)
*G02B 6/38* (2006.01)
(52) U.S. Cl. ................. 385/89; 385/53; 385/55; 385/59
(58) Field of Classification Search ............ 385/53, 385/55, 59, 89
See application file for complete search history.

(56) References Cited

U.S. PATENT DOCUMENTS

| | | | |
|---|---|---|---|
| 6,227,719 B1 | 5/2001 | Aoki et al. | |
| 6,305,848 B1 * | 10/2001 | Gregory | 385/53 |
| 6,334,784 B1 * | 1/2002 | Howard | 439/260 |
| 6,371,657 B1 * | 4/2002 | Chen et al. | 385/58 |
| 6,419,399 B1 | 7/2002 | Loder et al. | |
| 6,623,177 B1 * | 9/2003 | Chilton | 385/88 |
| 6,984,073 B2 | 1/2006 | Cox | |
| 2002/0181883 A1 | 12/2002 | Harris et al. | |
| 2005/0047795 A1 | 3/2005 | Windover et al. | |
| 2005/0078914 A1 | 4/2005 | Cox | |
| 2005/0281509 A1 * | 12/2005 | Cox et al. | 385/59 |

FOREIGN PATENT DOCUMENTS

| | | |
|---|---|---|
| CN | 2519539 Y | 10/2002 |
| JP | 2001-42170 A | 2/2001 |
| JP | 2003-515785 A | 5/2003 |
| JP | 2003-207694 A | 7/2003 |
| JP | 2004-507785 A | 3/2004 |
| JP | 2007-102013 A | 4/2007 |
| WO | 01/40839 A1 | 6/2001 |
| WO | 02-16989 A1 | 2/2002 |

OTHER PUBLICATIONS

"Research and Development of Ultra High Density Electronic SI Technology, Development of Technology for Rationally Using Energy", Report Accomplishment of Study in 2000, Association of Super-Advanced Electronics Technologies, 2000, pp. 377.

* cited by examiner

*Primary Examiner* — Uyen Chau N Le
*Assistant Examiner* — Chris Chu
(74) *Attorney, Agent, or Firm* — Sughrue Mion, PLLC

(57) ABSTRACT

Information processing equipment includes a photoelectric conversion module disposed on a circuit substrate, a first optical connector connected to the photoelectric conversion module through a plurality of first optical fibers and disposed to an edge portion of the circuit substrate, and a second optical connector disposed on an optical backplane and optically connected to the first optical connector. The disposing direction of the optical fibers in the photoelectric conversion module is in nonparallel with the main surface of the circuit substrate and the disposing direction of the optical fibers in the first optical connector and the disposing direction of the optical fibers in the second optical connector are in nonparallel with the main surface of the circuit substrate.

7 Claims, 13 Drawing Sheets

OPTICAL CONNECTION STRUCTURE BETWEEN OPTICAL BACKPLANE AND CIRCUIT SUBSTRATE

CROSS REFERENCE TO RELATED APPLICATION

This application is a divisional application of U.S. application Ser. No. 11/543,140 filed Oct. 5, 2006 which claims priority based on Japanese Patent Application No. 2005-293767 filed Oct. 6, 2005. The entire disclosures of the prior applications are hereby incorporated by reference.

BACKGROUND OF THE INVENTION

1. Field of the Invention

The present invention relates to a connection structure between an optical backplane and a circuit substrate for carrying out signal connection between a plurality of circuit substrates (boards), which are mounted in information processing equipment such as a router, a server, or the like, by optical signals, to circuit substrate, to an optical backplane connector, to photoelectric conversion module, and to a light transmission method.

2. Description of the Related Art

Recently, as a broadband network expands, an amount of information distributed through the network is increased. Consequently, it is required to increase the information processing capacity of information processing equipment such as a router, a server or the like. However, the limit of transmission speed of an electric substrate used in the equipment acts as a drawback to the increase of the capacity of the equipment. To further increase the information processing capacity of the information processing equipment by overcoming the drawback, it is effective to connect between boards accommodated in the equipment to each other by optical signals.

Ordinarily, the mutual optical connection of the interior of information equipment can be achieved by inserting a plurality of boards such as signal input/output boards, switch boards, and the like to an optical backplane, on which light transmission paths such as optical fibers and the like are laid, at right angles. Electric signals on a board is converted into optical signals by a photoelectric conversion module and sent to the optical backplane, and the optical signals transmitted on the optical backplane are returned to electric signals and transmitted to other board.

It is required to increase the information processing capacity of a piece of the equipment by increasing the density of boards by reducing the mounting intervals there between, as a requirement for making use of the advantage of the optical backplane.

A structure as shown in FIG. 1 is known as a conventional structure of the optical backplane. FIG. 1 is schematically drawn based on a photograph found in "Research and Development of Ultra High Density Electronic SI Technology, Development of Technology for Rationally Using Energy", Report of Accomplishment of Study in 2000, Association of Super-Advanced Electronics Technologies, pp. 377, (2000).

A plurality of optical fibers 2 placed in a juxtaposed state (side by side) and formed into a sheet state are attached on an optical backplane 1 (in the above document, the portion noted as Optical Fiber Board), the edge portions of the plurality of juxtaposed optical fibers 2 are bent such that the optical fibers are at right angles to the optical backplane 1, the optical fibers are attached to a connector 3 (in the above document, the connector noted as Right-Angle Connector), and the optical connector 3 is optically connected to an optical connector 5 disposed to an edge portion of a board 4. In this structure, the fibers in the edge portion of an optical fiber array are disposed in parallel with a surface of the board 4.

It should be noted that the above document and Japanese Patent Application National Publication No. 2003-515785 (FIGS. 2 to 4 and 9 to 12, and paragraph Nos. (0022) to (0023), (0027)) and Japanese Patent Application National Publication 2004-507785 (FIGS. 2 to 3 and 9 to 10) disclose that the disposing direction of a plurality of optical fibers, which are disposed to and accommodated in an optical connector passed through an optical backplane, is at a right angle to a circuit substrate, as a technology relating to the present invention.

In a structure in which a fiber disposing direction at the edge of an optical fiber array is in parallel with a surface of a board as described above, optical fibers are designed and laid to bypass a connector portion on an optical backplane as shown in FIG. 1. This is because when the optical fibers are laid to overlap a portion where a connector is attached, it is difficult to attach the connector. As a result, the optical fibers must be bent twice in a vertically standing-up portion 9 at the edges of the optical fibers and in a bypass portion 8 of the connector portion. A disadvantage arises here in that the optical fibers have a lower limit in a bending radius. According to the above documents, to bend, for example, ordinary multimode fibers twice, an interval between adjacent connectors must be set to a certain degree of length, for example, to 45 mm or more, and thus the mounting interval between boards cannot be reduced to less than 45 mm. Because of the above reasons, the structure of the conventional optical backplane has a disadvantage in that the mounting density of the optical backplane cannot be increased due to necessity of bypassing the connector portion when the optical fibers are laid and to the lower limit of the fiber bending radius.

SUMMARY OF THE INVENTION

Accordingly, an object of the present invention is to overcome the disadvantages described above and to improve the performance of a processing capacity in information processing equipment of a mode in which substrates are connected to each other by an optical backplane.

According to a first aspect of the present invention, there is provided information processing equipment which includes a photoelectric conversion module disposed on a circuit substrate, a first optical connector connected to the photoelectric conversion module through a plurality of first optical fibers and disposed to an edge portion of the circuit substrate, and a second optical connector disposed on an optical backplane and in which the first optical connector is optically connected to the second optical connector, wherein the photoelectric conversion module and the first optical connector dispose and accommodate both the edge portions of the plurality of first optical fibers, respectively, the second optical connector disposes and accommodates edge portions of the plurality of second optical fibers, the disposing direction of the first optical fibers in the photoelectric conversion module is in non-parallel with the main surface of the circuit substrate, and the disposing direction of the first optical fibers in the first optical connector and the disposing direction of the second optical fibers in the second optical connector are in nonparallel with the main surface of the circuit substrate.

According to a second aspect of the present invention, there is provided information processing equipment which includes a photoelectric conversion module disposed to an edge portion of a circuit substrate and an optical connector disposed on an optical backplane and in which a plurality of light input and output ports of the photoelectric conversion module are optically connected to the optical connector, wherein the optical connector disposes and accommodates edge portions of a plurality of optical fibers, the disposing direction of the optical fibers in the optical connector is in nonparallel with the main surface of the circuit substrate, the plurality of input and output ports of the photoelectric conversion module are disposed in a juxtaposed state, and the disposing direction of the plurality of light input/output ports are in nonparallel with the main surface of the circuit substrate.

According to a third aspect of the present invention, there is provided information processing equipment in which a first electric connector disposed on an optical backplane is electrically connected to a second electric connector disposed on a circuit substrate, wherein a photoelectric conversion module is accommodated in the first electric connector, the photoelectric conversion module includes a plurality of juxtaposed light input and output ports, an optical connector is disposed to edge portions of a plurality of optical fibers laid on the optical backplane, the optical connector accommodates edge portions of the plurality of juxtaposed optical fibers, the photoelectric conversion module is optically connected to the optical connector, the disposing direction of the optical fibers in the optical connector is in nonparallel with the main surface of the circuit substrate, and the disposing direction of the light input and output ports of the photoelectric conversion module is in nonparallel with the main surface of the circuit substrate.

According to a fourth aspect of the present invention, there is provided a circuit substrate which includes a photoelectric conversion module disposed on a main surface, is characterized in that a plurality of optical signals are output from the photoelectric conversion module in a juxtaposed state or a plurality of optical signals are input to the photoelectric conversion module in a juxtaposed state, and the plurality of optical signals output or input in the juxtaposed state are output or input in nonparallel with the main surface of the circuit substrate.

According to a fifth aspect of the present invention, there is provided an optical backplane connector capable of being attached to an optical backplane including a concave portion which can accommodate at least one photoelectric conversion module having a plurality of juxtaposed light input and output ports, wherein the concave portion includes electric contacts connected to electric contacts of the photoelectric conversion module, and the photoelectric conversion module can be inserted into the concave portion such that the disposing direction of the plurality of light input/output ports of the photoelectric conversion module is in nonparallel with the main surface of a circuit substrate attached to the optical backplane at about a right angle.

According to a sixth aspect of the present invention, there is provided a photoelectric conversion module which is attached to a circuit substrate and disposes and accommodates edge portions of optical fibers, wherein the disposing direction of the optical fibers is in nonparallel with a surface on the photoelectric conversion module, the surface being attached to the circuit substrate.

According to a seventh aspect of the present invention, there is provided a light transmission method which includes outputting a plurality of juxtaposed optical signals from a photoelectric conversion module disposed in an electric connector disposed on a circuit substrate or electrically connected to the circuit substrate to the circuit substrate in nonparallel therewith, and receiving the plurality of juxtaposed optical signals by a light connector disposed on an optical backplane disposed at about a right angle to the circuit substrate, to the circuit substrate in nonparallel therewith.

According to an eighth aspect of the present invention, there is provided a light transmission method which includes outputting a plurality of juxtaposed optical signals from a light connector disposed on an optical backplane disposed at about a right angle to a circuit substrate, to a circuit substrate in nonparallel therewith, and receiving the plurality of juxtaposed optical signals by a photoelectric conversion module disposed in an electric connector disposed on the circuit substrate or electrically connected to the circuit substrate, to a circuit substrate in nonparallel therewith.

It should be noted that the term "about a right angle" used in the application also includes a case in which an angles is deviated in such a degree that it is substantially assumed a right angle, in addition to a right angle.

According to the present invention, the mounting density of a circuit substrate or an optical backplane, and the mounting density of the circuit substrate to the optical backplane can be increased.

DESCRIPTION OF THE PREFERRED EMBODIMENTS

Embodiments of the present invention will be described below in detail with reference to the drawings.

First Embodiment

Figure 2:
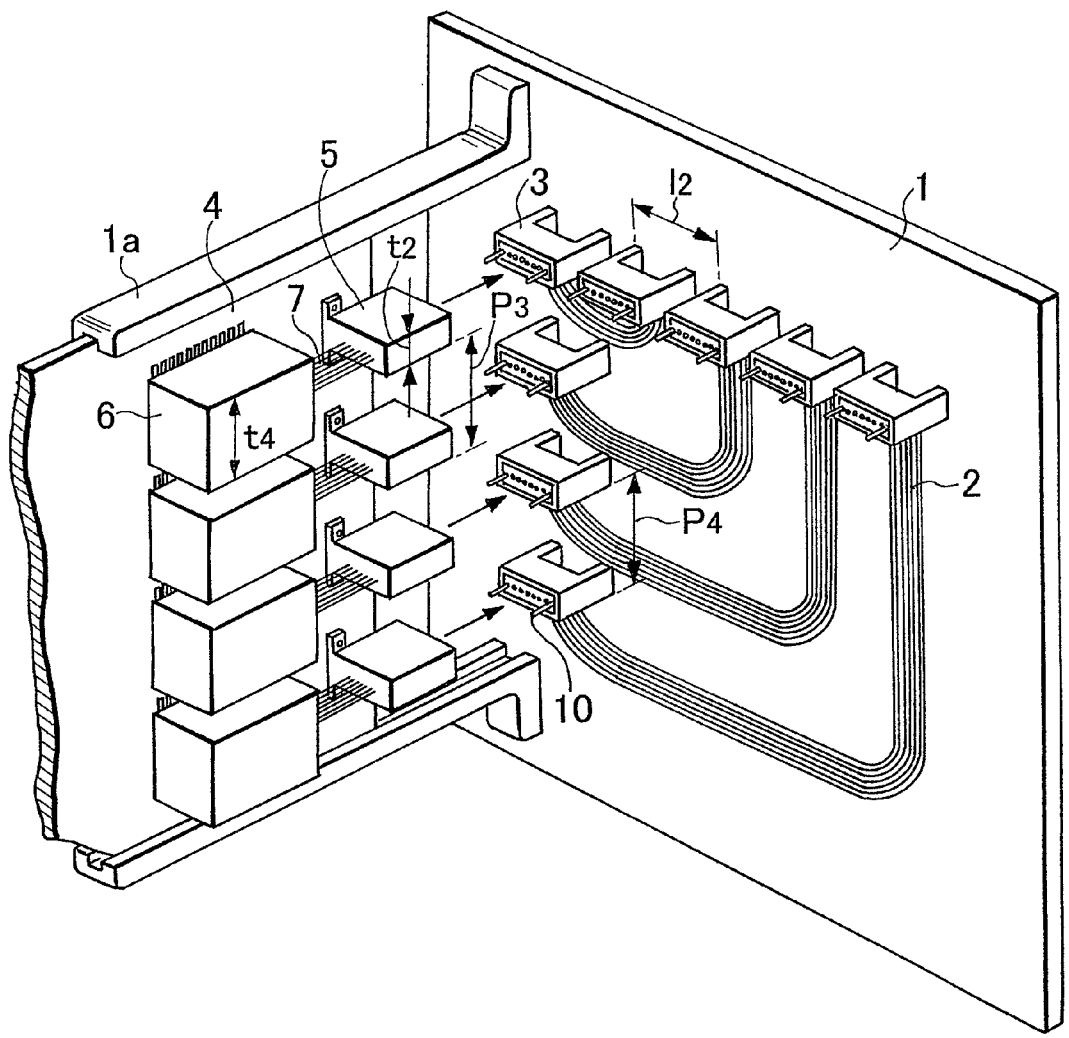
FIG. 2 is a perspective view showing a connecting portion of a circuit substrate and optical backplane in a first embodiment of information processing equipment of the present invention.
Figure 5:
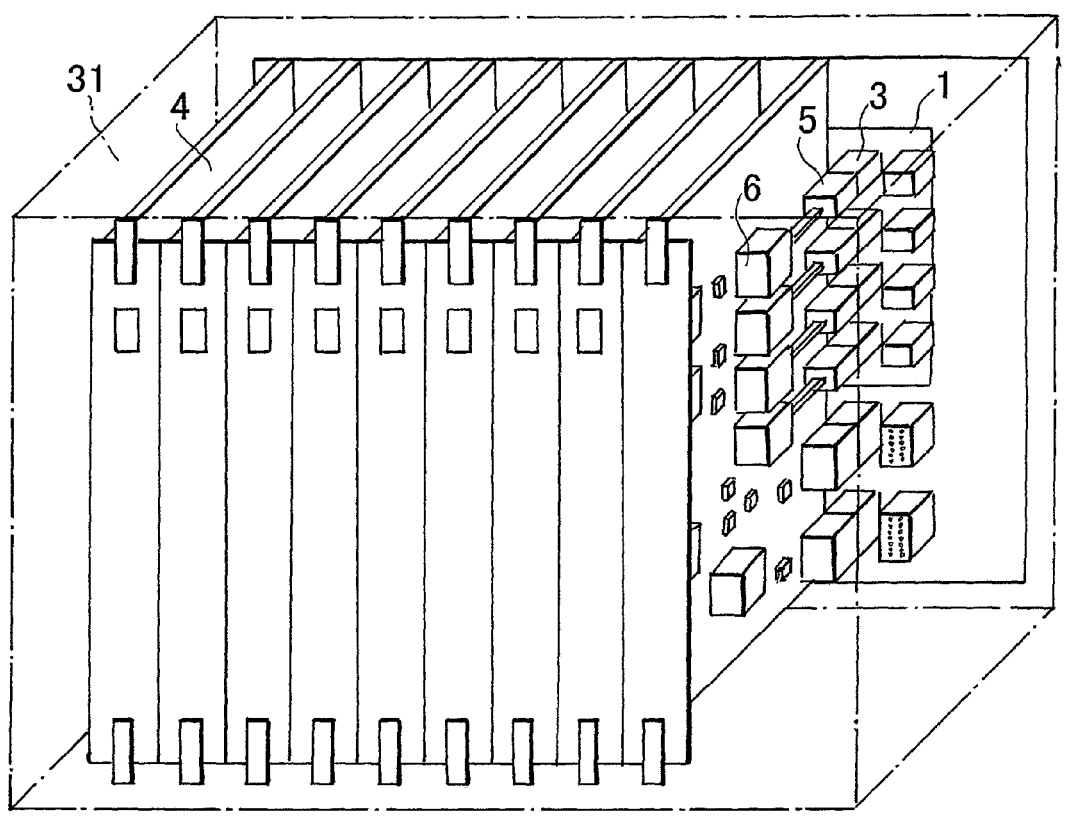
FIG. 5 is a perspective view showing an overall arrangement of the information processing equipment.

FIG. 2 is a perspective view showing a connecting portion between a circuit substrate and optical backplane of a first embodiment of information processing equipment according to the present invention. FIG. 5 is a perspective view showing an overall arrangement of the information processing equipment.

As shown in FIG. 5, in the information processing equipment of the present invention, a plurality of circuit substrates 4 are accommodated in a cabinet 31, and the plurality of circuit substrates 4 are disposed to an optical backplane 1 at about right angles. Optical connectors 5 and photoelectric conversion modules 6 on the circuit substrates side are disposed on the circuit substrates 4, and optical connectors 3 on the optical backplane side are disposed to the optical backplane 1. The optical connectors 3 are optically connected to the optical connectors 5. There are, for example, a router, a server, and the like as the information processing equipment according to the first embodiment.

As shown in FIG. 2, a plurality of optical fibers 2 placed in a juxtaposed state (side by side) and formed into a sheet state are attached on an optical backplane 1. The plurality of optical fibers 2 are attached to the optical connectors 3 while bending end portions of the optical fibers 2 such that the light incoming and outgoing direction from and to the edges of the optical fibers is at about a right angle to the main surface of the optical backplane 1. The optical connectors 3 dispose and accommodate the end portions of the plurality of optical fibers 2. With this arrangement, an optical connector correspond to a board (which acts as the circuit board) is optically wired to an optical connector corresponding to another board by the optical fibers 2. At the time, the optical connectors 3 are installed on the optical backplane 1 such that the disposing direction of the optical fibers of the optical connectors 3 is at about a right angle to the main surface of the board 4 acting as the circuit substrate. On the other hand, the optical connectors 5, in which a plurality of optical fibers are accommodated in a juxtaposed state (side by side), are installed to an end portion of the board 4 such that the disposing direction of the optical fibers of the optical connectors 5 on the board sides is at about a right angle to the main surface of the board 4. The optical connectors 5 on the board 4 are connected to the photoelectric conversion modules 6 on the board through optical fiber arrays 7. Guides 1a are attached to the optical backplane 1, and as soon as the board 4 is inserted into the guides 1a, the optical connectors 3 on the optical backplane 1 are optically connected to the optical connectors 5 on the board 4. Although only a pair of the guides 1a are shown in FIG. 2, the guides 1a corresponding to the number of the boards inserted into the optical backplane 1 are attached to the optical backplane 1. Five boards are attached to the optical backplane 1 shown in FIG. 2, four optical connectors 5 are attached to the board on the left side in the figure, and the four optical connectors 5 are connected to the four optical connectors 3 on the optical backplane 1. The four optical connectors 3 are disposed approximately in parallel with the main surface of the board 4 (disposed in an up/down direction in the figure). One optical connector 5 is attached to each of the remaining four boards, and the optical connectors 5 on the remaining boards are connected to the remaining four optical connectors 3 on the optical backplane 1, respectively.

Optical fibers of the photoelectric conversion modules 6 are disposed such that the direction thereof is at about a right angle to the main surface of the board 4. The photoelectric conversion module can be made by disposing a photoelectric conversion chip such that it is at about a right angle to an attachment surface of the board 4 and accommodating the chip in the photoelectric conversion module.

Figure 1:
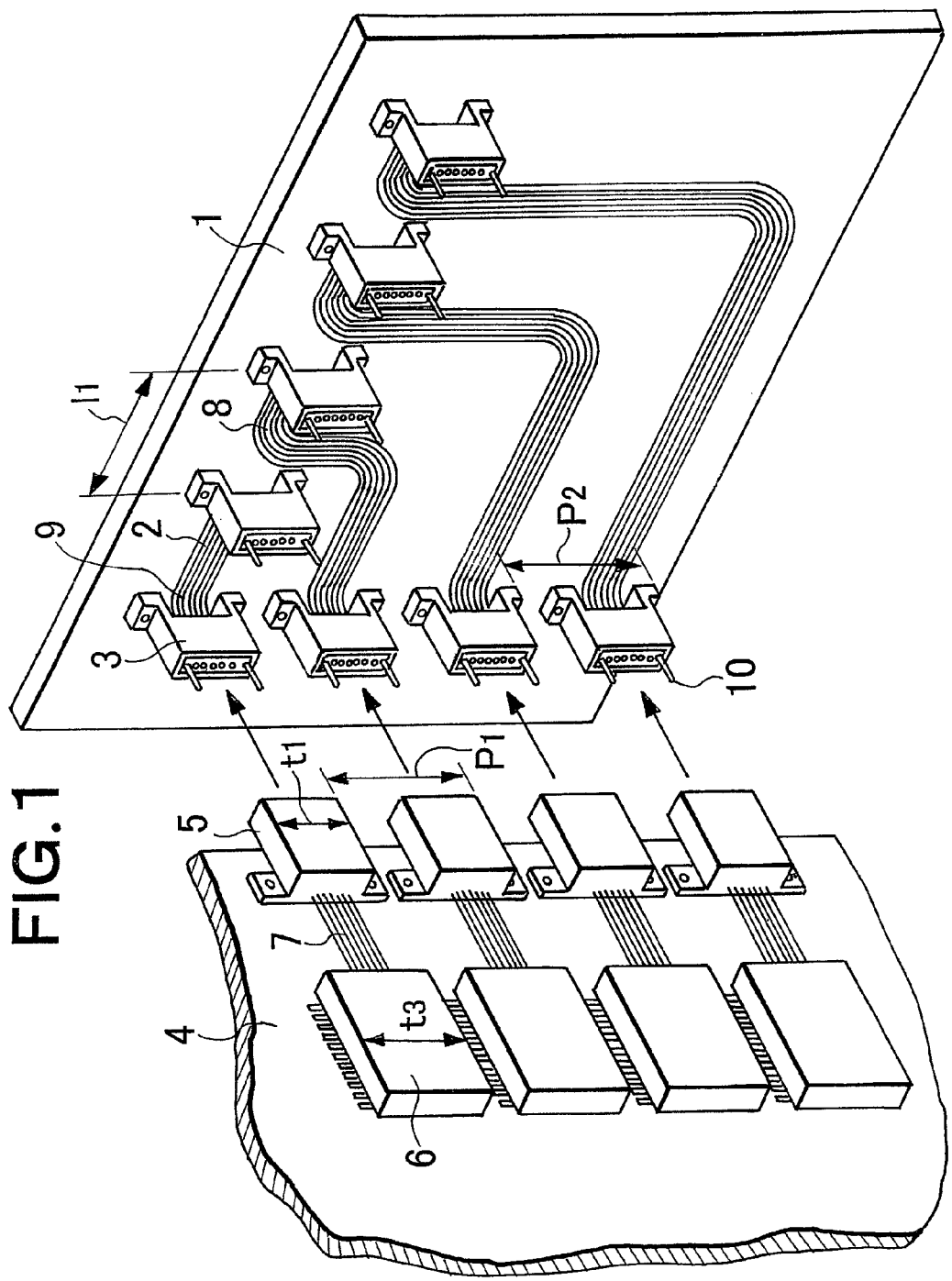
FIG. 1 is a perspective view showing a connection structure of information processing equipment of a conventional example.

In the first embodiment, the optical fibers of the photoelectric conversion modules 6 are disposed in a direction at about a right angle to the main surface of the board 4. However, the direction is not limited to about a right angle, and it is sufficient that the optical fibers of the photoelectric conversion modules 6 is disposed in nonparallel with the main surface of the board 4. The disposing direction of the optical fibers is preferably 45° to 135° (an angle of 45 degrees to 135 degrees) and most preferably about 90° (an angle of about 90 degrees, that is, about a right angle) to the main surface of the board 4. In the nonparallel direction, when the width of a conventional photoelectric conversion module 6 is shown by t3, since the width of the photoelectric conversion module 6 of the first embodiment is set to t4 (width t4<width t3) as apparent from comparison of FIG. 2 with FIG. 1, the width of the photoelectric conversion module 6 of the first embodiment can be reduced, and thus the mounting density of the board 4 can be increased.

Further, in the first embodiment, the optical fibers of the optical connectors 3 on the optical backplane 1 and the optical fibers of the optical connectors 5 on the board 4 are disposed in the direction at about a right angle to the main surface of the board 4. However, the direction is not limited to about a right angle, and it is sufficient that the optical fibers of the optical connectors 3 and optical connectors 5 be disposed in nonparallel with the main surface of the board 4. The disposing direction of the optical fibers is preferably 45° to 135° and most preferably about 90° (about a right angle) to the main surface of the board 4. When the disposing direction of the optical fibers of the optical connectors 5 is nonparallel with the main surface of the board 4 and the width of a conventional optical connector 5 is shown by t1, since the width of the optical connector 5 is set to t2 (width t2<width t1) as apparent from comparison of FIG. 2 with FIG. 1, the connector mounting density of the board 4 can be increased by reducing the pitch between the optical connectors (pitch P3<pitch P1).

Further, in the optical backplane 1, the pitch of the optical connectors 3 in the direction parallel with the board 4 can be also reduced (pitch P4<pitch P2). Further, in FIG. 1, since the optical connectors 3 are disposed in parallel with the main surface of the board 4, the optical fibers must be bent twice between the optical connector 3. However, when the optical connectors 3 are inclined such that they are at nonparallel angles to the main surface of the board 4, the bypass portions 8 of the connector portions of the optical fibers between the optical connectors 3 can be less bent, and thus a distance necessary to bend the optical fibers can be reduced (at 45° to 135°, almost no distance is necessary to bend the bypass portions 8 of the optical fibers, and, at about 90°, the bending itself of the bypass portions 8 of the connector portions can be eliminated). As a result, the pitch of the optical connectors 3 in the direction at a right angle to the main surface of the board 4 can be reduced (pitch l2<pitch l1).

Figure 3:
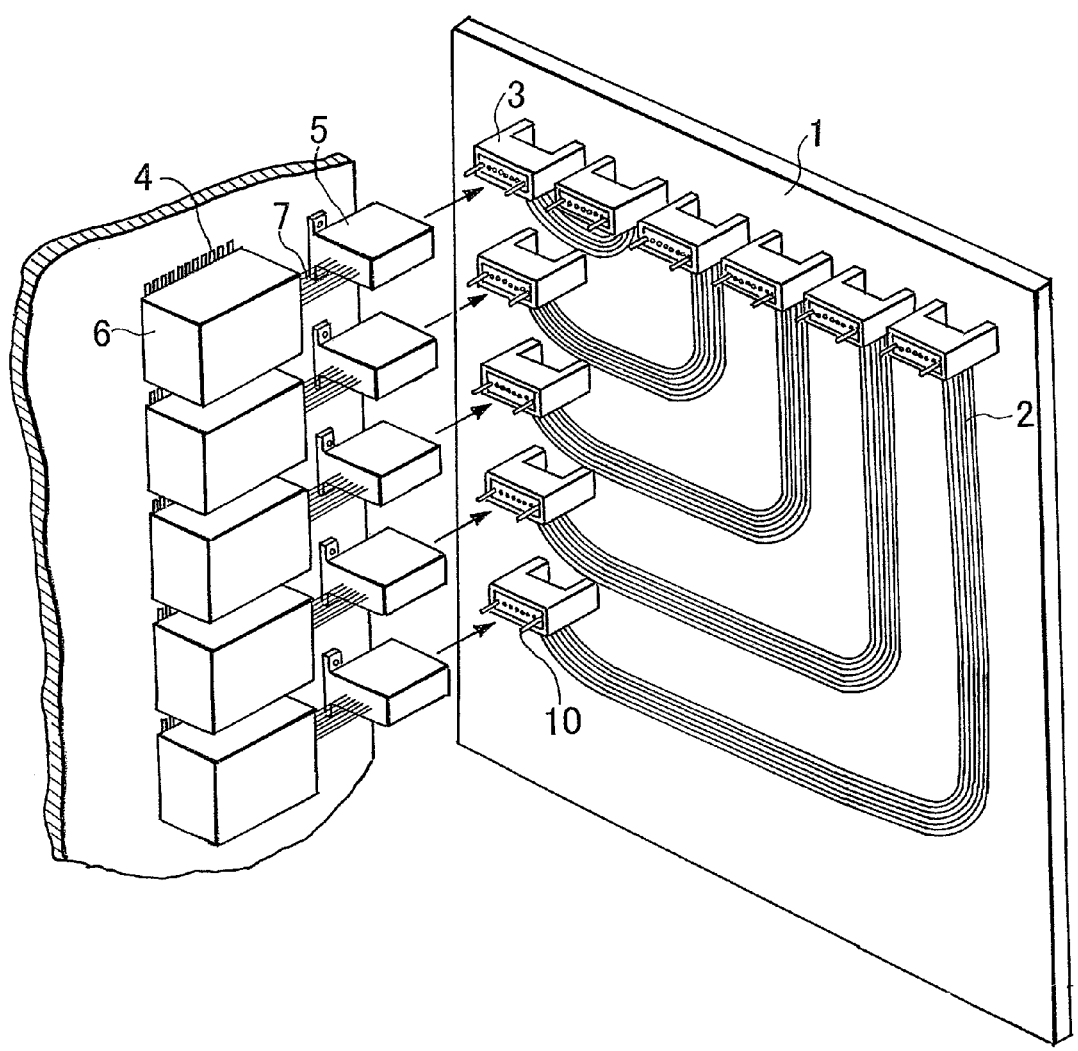
FIG. 3 is a perspective view showing a state that a mounting density of a board 4 and optical backplane 1 can be improved by increasing the number of photoelectric conversion modules 6, optical connectors 5, and optical connectors 3.

Since the width t4 of the photoelectric conversion modules, the width t2 of the optical connectors, the pitches P3 and P4, and the pitch l2 can be reduced as described above, the mounting density of the photoelectric conversion modules 6 and the optical connectors 5 on the board 4 and the mounting density of the optical connectors 3 on the optical backplane 1 can be increased as shown in FIG. 3, thereby the number of the photoelectric conversion modules 6, the optical connectors 5, and the optical connectors 3 that can be mounted can be increased.

It is preferable that the disposing direction of the optical fibers of the photoelectric conversion modules 6 is the same as the disposing direction of the optical fibers the optical connectors 5. However, the disposing direction of the optical fibers of the optical connectors 5 to the main surface of the board 4 may be different from the disposing direction of the optical fibers of the photoelectric conversion modules 6 to the main surface of the board 4, within in a range in which they can be connected to each other through the optical fibers 7.

Further, in the embodiment, although the optical fibers of the optical connectors are disposed in one row, they may be disposed in more than one row.

Figure 4:
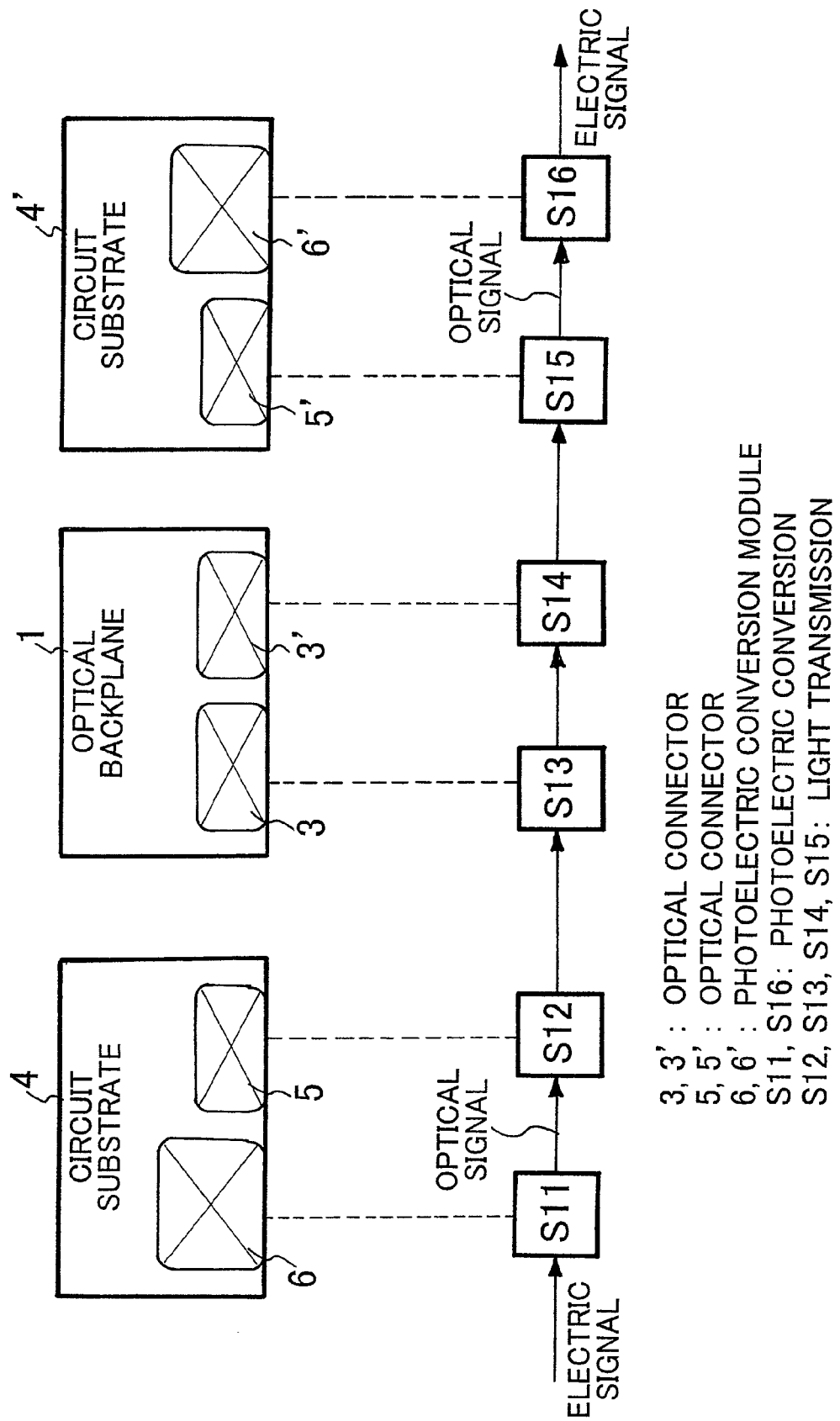
FIG. 4 is a view showing a flow of a light transmission method.

A light transmission method according to the first embodiment will be explained using FIGS. 2 and 4. FIG. 4 is a view showing a flow of the light transmission method.

Two circuit substrates (boards) 4, 4' are attached to the optical backplane 1. Electric signals are photoelectrically converted to optical signals by a photoelectric conversion module 6 disposed on the one circuit substrate 4 (step S11), the optical signals are output in nonparallel with the circuit substrate 4 in a juxtaposed state and sent to the optical backplane 1 through an optical connector 5 on the circuit substrate 4 and through an optical connector 3 on the optical backplane 1 (steps S12, S13). The optical connector 3 is connected to other optical connector 3' on the optical backplane 1 through the plurality of optical fibers 2, and thus the optical signals are sent to the other optical connector 3' (step S14). The optical signals are sent in nonparallel with the other circuit substrate 4' in a juxtaposed state through the other optical connectors 3' on the optical backplane 1 and though a connector 5' disposed on the other circuit substrate 4' (step S15) and photoelectrically converted to electric signals by a photoelectric conversion module 6' of the other circuit substrate 4' (step S16).

Second Embodiment

Figure 6:
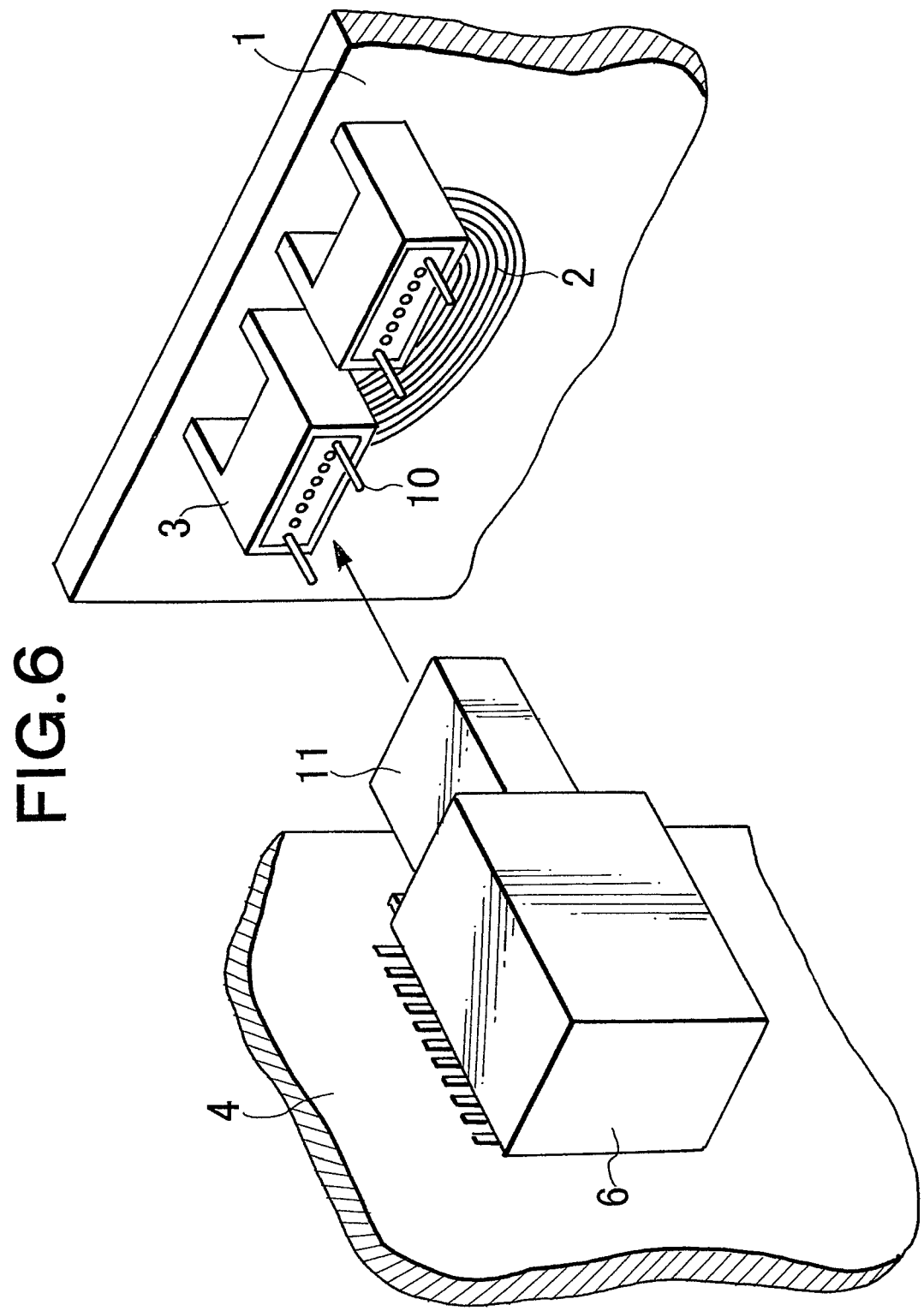
FIG. 6 is a perspective view showing a connecting portion of a circuit substrate and optical backplane in a second embodiment of the information processing equipment of the present invention.

FIG. 6 is a perspective view showing a connecting portion of a circuit substrate and optical backplane in a second embodiment of the information processing equipment of the present invention. In FIG. 6, the same components as those of FIG. 2 are denoted by the same reference numeral, and the explanation thereof is omitted. A photoelectric conversion module 6 having an optical interface 11 connectable to an optical connector 3 is mounted to an edge portion of a board 4 acting as a circuit substrate, and light incoming and outgoing ports of the optical interface 11 of the photoelectric conversion module 6 are disposed at about right angles to the main surface of the board 4. Simultaneously with insertion of the board 4 into guides 1a (not shown in FIG. 6), the optical connector 3 on the optical backplane is optically connected to the optical interface 11 of the photoelectric conversion module 6 mounted on the board 4. The second embodiment has the same structure as that of the first embodiment except that the photoelectric conversion module 6 includes the optical interface 11.

The second embodiment can increase the mounting density on the board in addition to the advantage of the first embodiment because no optical fiber is disposed on the board to connect the optical connector to the photoelectric conversion module.

Third Embodiment

Figure 7A:
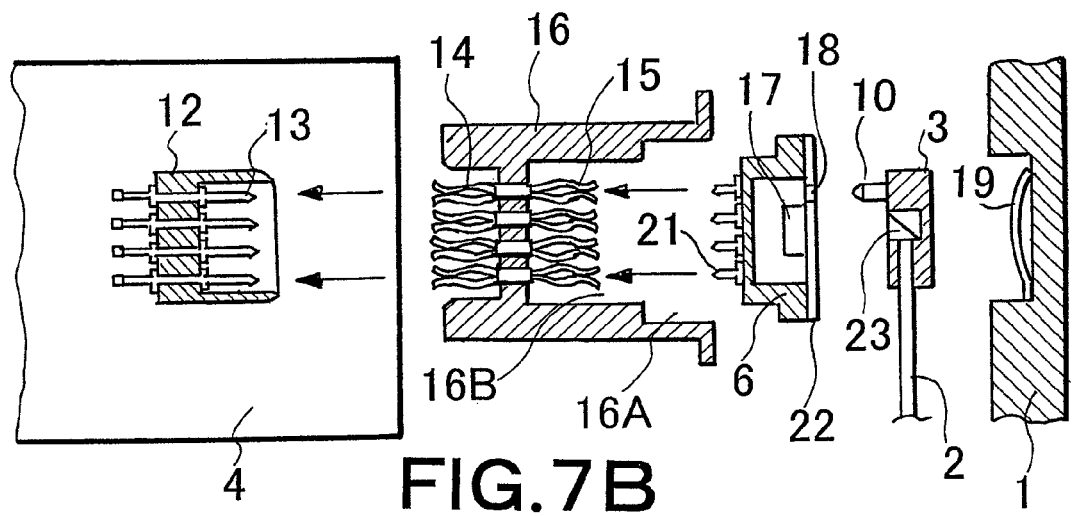
FIG. 7 is a perspective view showing a connecting portion of a circuit substrate and optical backplane in a third embodiment of the information processing equipment of the present invention.
Figure 7B:
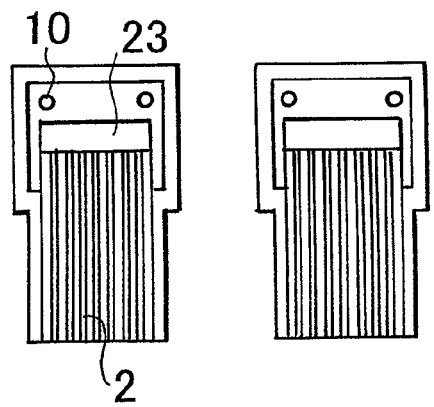
Figure 7C:
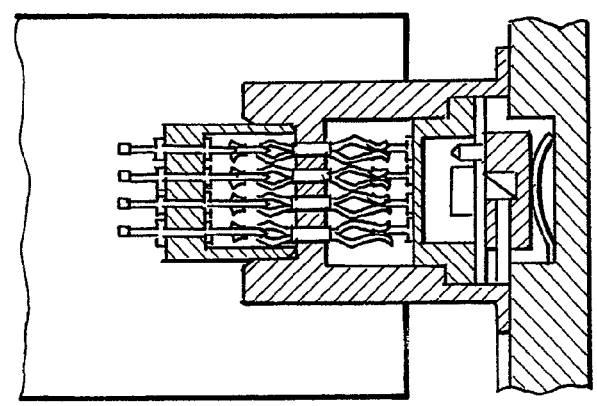

FIGS. 7A to 7C are views showing a connecting portion of a circuit substrate and optical backplane in a third embodiment of the information processing equipment of the present invention. FIG. 7A is an exploded sectional view of an arrangement of the third embodiment when viewed from the upper surface of a board, FIG. 7B is a view when viewed from the front surface of an optical backplane, and FIG. 7C is a sectional view of a state that the board is inserted into the optical backplane when viewed from the upper surface of the board.

An overall arrangement of the information processing equipment of the third embodiment is different from the first embodiment in that no photoelectric conversion module is mounted on the circuit substrate, an electric connector is disposed on the circuit substrate, an photoelectric conversion module is disposed in an electric connector on the optical backplane, and the photoelectric conversion module is directly connected to an optical connector on the optical backplane. In the information processing equipment, the circuit substrate and the optical backplane are disposed in a cabinet similarly to the arrangement shown in FIG. 5. Optical fibers 2 of the optical connector on the optical backplane side are laid similarly to FIG. 2.

Figure 8:
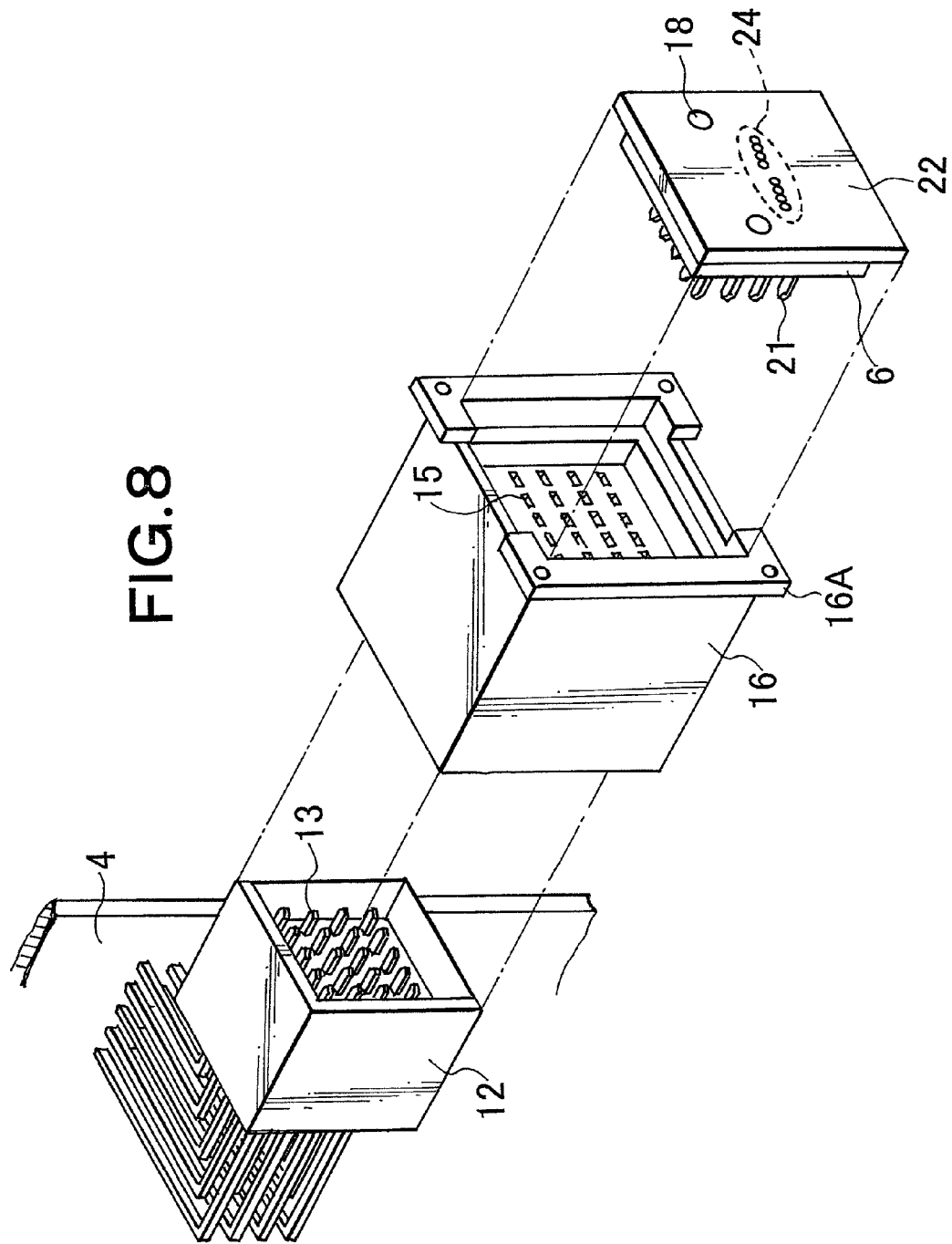
FIG. 8 is an exploded perspective view of an electric connector on a board side, an electric connector on an optical backplane side, and a photoelectric conversion module.
Figure 9:
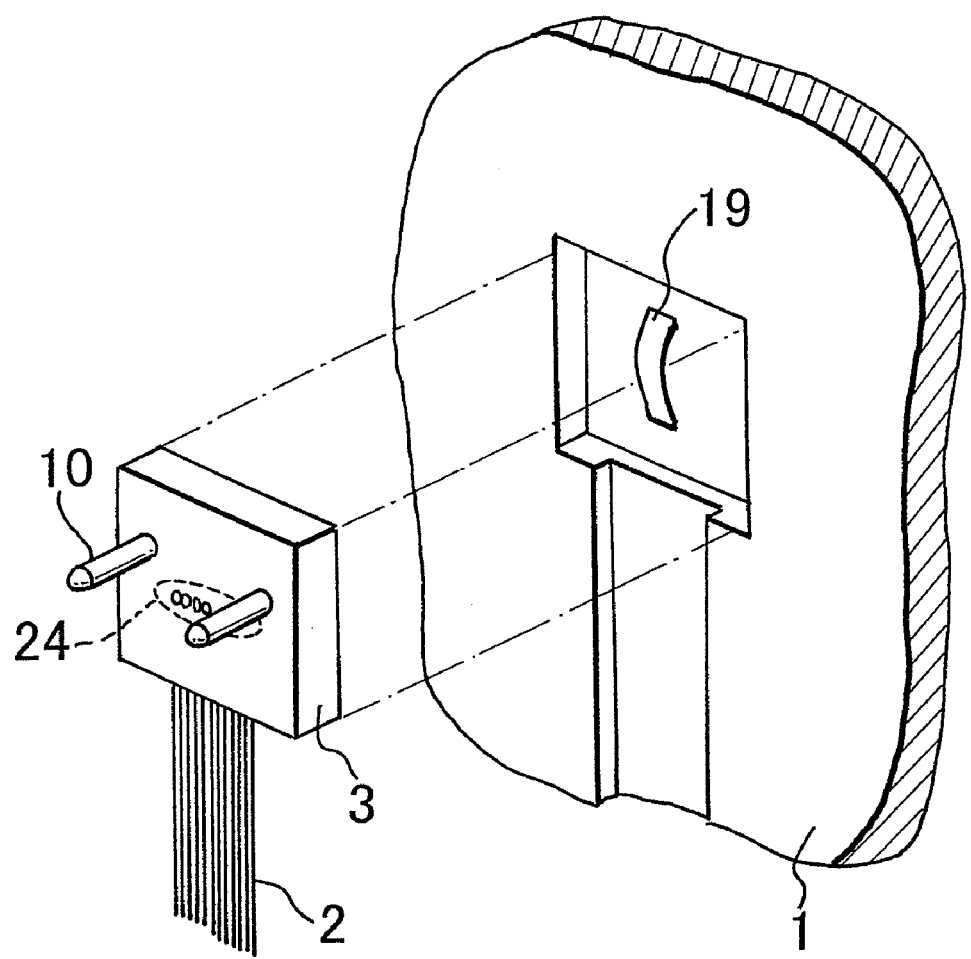
FIG. 9 is an exploded perspective view of the optical connector and the optical backplane.

FIG. 8 is an exploded perspective view of the electric connector on the board, the electric connector on the optical backplane, and the photoelectric conversion module, and FIG. 9 is an exploded perspective view of the optical connector and optical backplane.

The electric connector 16 acting as an optical backplane connector is disposed to the optical backplane 1 on which a plurality of optical fibers 2 are laid in a juxtaposed state. Although not shown here, guides 1a are disposed to the optical backplane likewise FIG. 2 so that the board 4 can be inserted and drawn out in a direction at about a right angle to the main surface of the optical backplane 1. The photoelectric conversion module 6 is accommodated in the electric connector 16. The electric connector 16 on the optical backplane includes outside electric contacts 14 and inside electric contacts 15. The outside electric contacts 14 are electrically connected to electric contacts 13 of the electric connector 12 disposed to the board 4, and the inside electric contacts 15 are electrically connected to electric contacts 21 of the photoelectric conversion module 6. The incoming and outgoing light of the photoelectric conversion module 6 is caused to travel in a direction at about a right angle to the optical backplane 1. The electric connector 16 has a concave portion formed according to the shape of the photoelectric conversion module 6 so that the photoelectric conversion module 6 is fitted to the concave portion, thereby the photoelectric conversion module 6 can be accommodated in the electric connector 16. The inside electric contacts 15 are disposed in the concave portion (here, on the bottom of the concave portion), and the inside electric contacts 15 of the electric connector 16 are electrically connected to the electric contacts 21 of the photoelectric conversion module 6 by inserting the photoelectric conversion module 6 into the concave portion.

As shown in FIG. 8, since cutouts are formed at two positions of a part of an optical backplane attachment portion 16A of the electric connector 16 acting as the optical backplane connector and a light transmission substrate 22 of the photoelectric conversion module 6 inserted into the electric connector 16 is exposed to the cutouts, the photoelectric conversion module 6 can be taken out from the electric connector 16 by gripping the light transmission substrate 22, thereby the photoelectric conversion module 6 can be easily taken out.

The incoming/outgoing light of the photoelectric conversion module 6 is caused to travel in a direction at about a right angle to the optical backplane 1. Since the incoming and outgoing light travels at about a right angle to the optical backplane 1, displacement of an optical axis is less affected by dispersion of the pushed amount of the photoelectric conversion module 6 when the photoelectric conversion module 6 is fitted to the optical connector 3.

The photoelectric conversion module 6 is electrically wired at high speed to the electric connector 12 on the circuit substrate through the electric contacts 21, 15, 14, and 13.

A fitting hole 18 is formed to the light transmission substrate 22 of the photoelectric conversion module 6 so that a guide pin 10 disposed to the optical connector 3 is fitted into the fitting hole 18. The electric contacts 21 of the photoelectric conversion module 6 are kept in contact and in electric conduction with the inside electric contacts 15 of the electric connector 16 by the elastic force of the inside electric contacts 15. With this structure, even if the photoelectric conversion module 6 fails, it can be easily replaced by removing the electric connector 16, thereby good maintainability can be ensured.

To replace the photoelectric conversion module 6, the board 4 is drawn and removed from the electric connector 16, and the electric connector 16 is removed from the optical backplane 1. Next, the photoelectric conversion module 6 accommodated in the electric connector 16 is taken out, and a new photoelectric conversion module is accommodated therein. Here, since the electric connector 16 acting as the optical backplane connector is fixed to the optical backplane 1 by screws, the electric connector 16 is taken out from the optical backplane 1 by removing the screws.

The optical connector 3, which has a 45° mirror (45 degrees mirror) 23 acting as a light path conversion means and the guide pin 10, is attached to an edge portion of the optical fibers 2 on the optical backplane 1. The optical connector 3 is positioned by fitting the guide pin 10 thereof into the fitting hole 18 on the photoelectric conversion module 6. An optical device 17 in the photoelectric conversion module 6 is optically coupled with the optical fibers 2 through the 45° mirror (45 degrees mirror) 23 in the optical connector 3. The optical device is a light receiving device, a light emitting device, or the light receiving device and the light emitting device. The light receiving device has a plurality of light receiving portion and the light emitting device has a plurality of light emitting portions. The optical device 17 receives the light from the optical connector 3 and converts it into electric signals, or/and converts the electric signals from the board 4 into optical signals. Since the optical fibers 2 are coupled with the photoelectric conversion module 6 through the 45° mirror 23, they need not be bent. Accordingly, the optical connectors can be disposed at a narrow pitch by reducing the intervals there between irrespectively of the limit of the bending radius of the optical fibers which becomes a problem when a light path is converted by bending optical fibers. The optical device 17 is disposed on a semiconductor substrate which is disposed on the light transmission substrate 22, and a convex module body is disposed on the light transmission substrate 22 so as to cover the optical device 17. The electric contacts 21 are disposed on the module body.

A spring 19 is interposed between the optical connector 3 and the optical backplane 1, thereby the photoelectric conversion module 6 is kept in physical contact with the optical connector 3 by the elastic force of the spring 19. With this arrangement, it can be prevented that a coupling efficiency is made unstable by intervals excessively formed between the photoelectric conversion module and a light transmission path.

It is sufficient that an elastic body be inserted between the optical connector 3 and the optical backplane 1, and a coiled spring, a rubber sheet, a leaf spring, urethane, and the like may be used in place of the spring.

Figure 10:
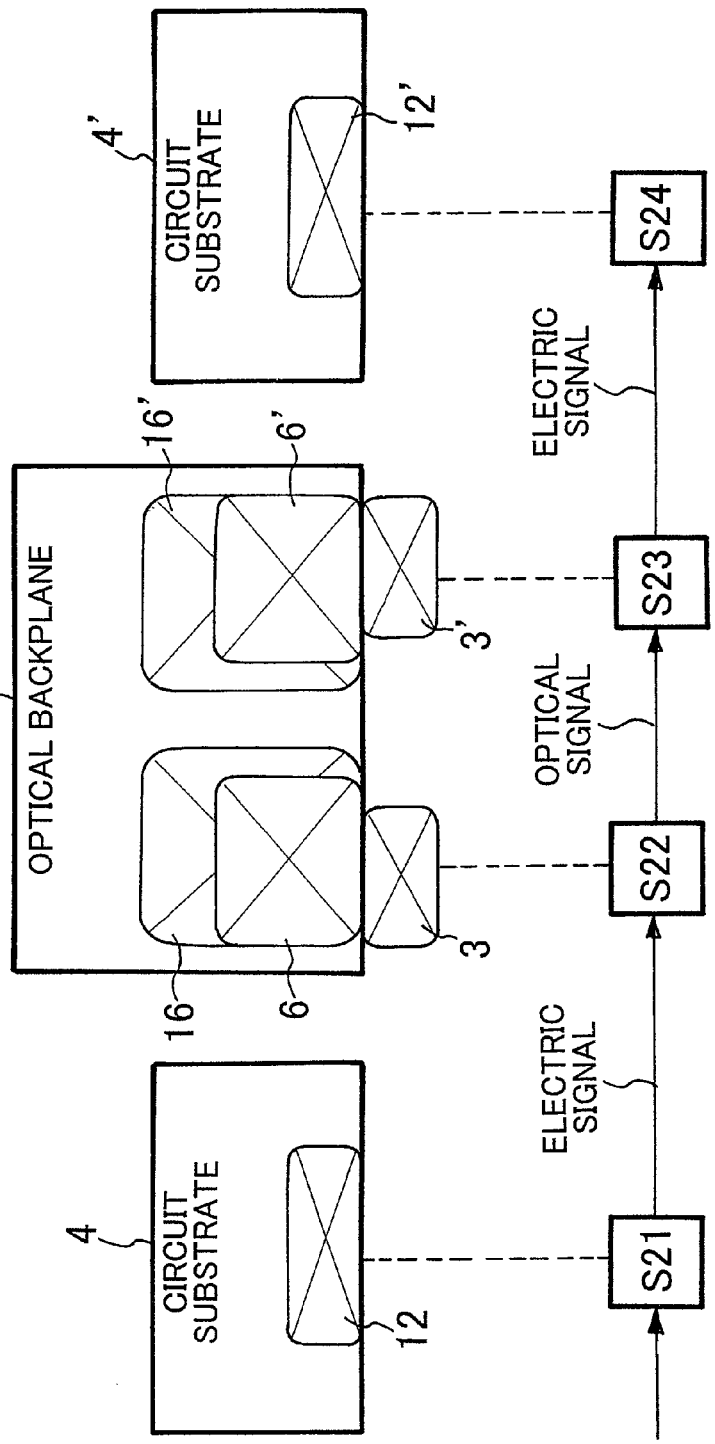
FIG. 10 is a view showing a flow of a light transmission method.

A light transmission method according to the third embodiment will be explained using FIG. 10.

The two circuit substrates 4, 4' are attached to the optical backplane 1, and the electric signals processed by a circuit disposed on the one circuit substrate 4 are output from the electric connector 12 on the circuit substrate 4 (step 21), input to the photoelectric conversion module 6 in the electric connector 16 attached to the optical backplane 1, and photoelectrically converted into optical signals (step S22). The optical signals are output to the optical connector 3 in nonparallel with the circuit substrate 4 in a juxtaposed state, sent to a photoelectric conversion module 6' in other electric connector 16' through optical fibers and other optical connector 3', thereby the optical signals are photoelectrically converted into electric signals (step S23). The photoelectrically converted electric signals are sent to other electric connector 12' of the other circuit substrate 4' connected to the other electric connector 16' of the optical backplane 1 and subjected to signal processing by the other circuit substrate 4' (step S24).

Figure 11:
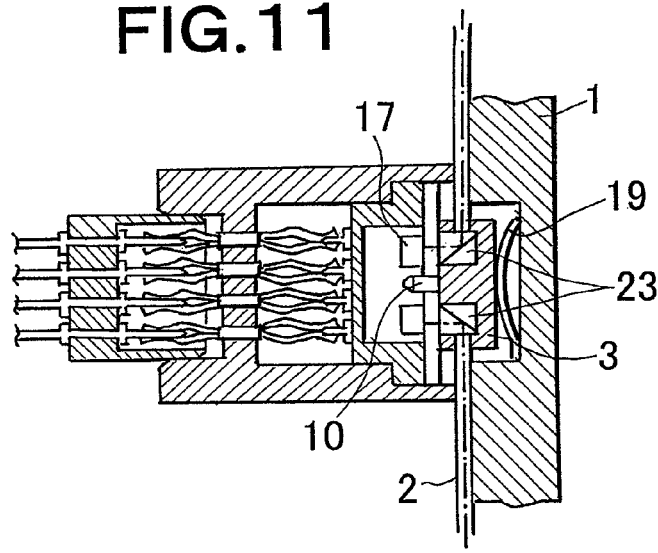
FIG. 11 is a sectional view showing an arrangement when two optical devices are accommodated in the photoelectric conversion module.

In the arrangement explained above, the case, in which one optical device is accommodated in the photoelectric conversion module, is explained. In the third embodiment, however, two optical devices may be accommodated in the photoelectric conversion module as shown in FIG. 11.

The two optical devices 17 are accommodated in a photoelectric conversion module 6, and two 45° mirrors are disposed to an optical connector 3 and coupled with optical fibers 2 extending in different directions, respectively. A fitting hole 18 on the photoelectric conversion module 6 side is formed between the optical devices 17, and a guide pin 10 of the optical connector 3 is inserted into the fitting hole 18. With the embodiment arranged as described above, when, for example, a switch substrate acting as a circuit substrate mounted in the vicinity of a central portion of a lack is connected to signal input and output substrates acting as a circuit substrate mounted on both right and left sides, and the like, optical fibers can be simply wired on an optical backplane, thereby they can be optically connected to each other effectively. Although the case that the two optical devices and the two optical fibers 2 are employed is explained in FIG. 11 to make explanation understand able, more than two optical devices and optical fibers may be employed.

Further, in the third embodiment, the optical backplane may be provided with a lid so that the photoelectric conversion module can be drawn out from the optical backplane side.

Figure 12A:
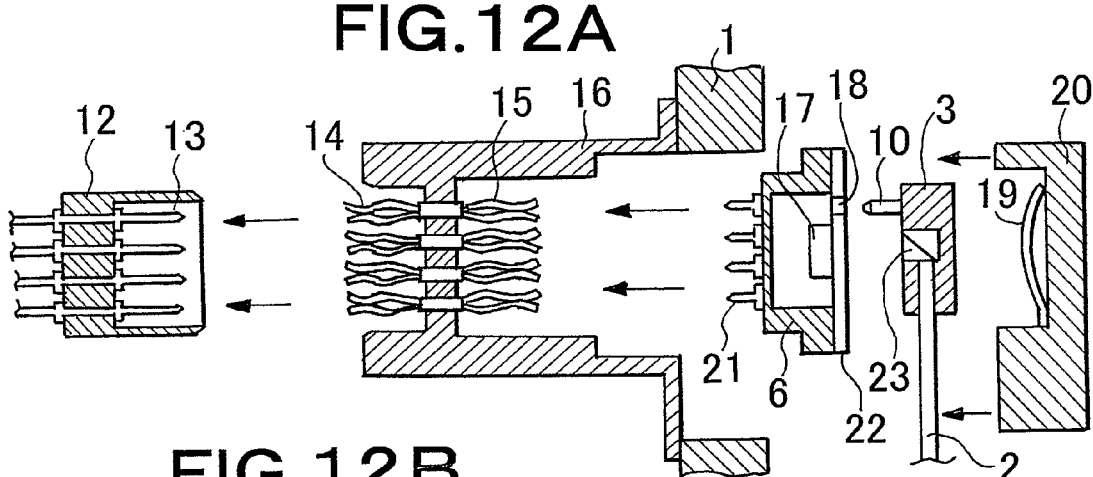
FIG. 12A is a sectional view of the arrangement when viewed from the upper surface of a board.
Figure 12B:
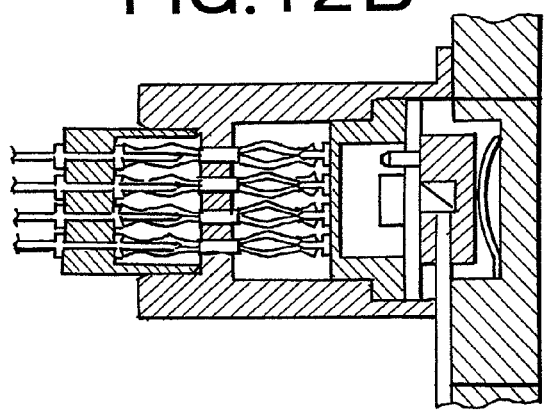
FIG. 12B is a sectional view of a state when the board inserted into an optical backplane is viewed from the upper surface thereof.
Figure 13:
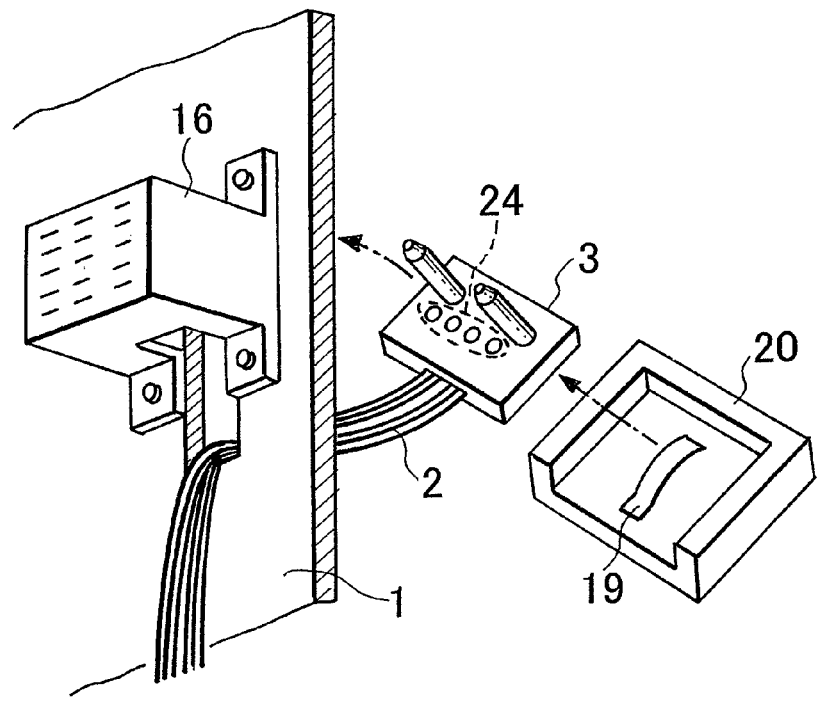
FIG. 13 is a view showing a method of attaching a lid to an optical connector.

FIG. 12A is an exploded sectional view of the arrangement when it is viewed from the upper side of a board, FIG. 12B is a sectional view of the arrangement viewed from the upper surface of the board in a state in which the board is inserted into an optical backplane. Further, FIG. 13 is a view showing a method of attaching the lid to an optical connector. In FIGS. 12A, 12B and FIG. 13, the same components as those of FIGS. 7 and 8 are denoted by the same reference numerals, and the explanation thereof is omitted.

A through-hole is formed to the optical backplane, and the lid 20 is disposed to close the through-hole. The photoelectric conversion module 6 can be taken out backward of the optical backplane 1 by lifting the lid 20, extracting a guide pin 10 of the optical connector 3 from a fitting hole 18 of the photoelectric conversion module 6 and drawing out it backward of the optical backplane 1. With this structure, when the photoelectric conversion module 6 fails, and the like, it can be easily removed and replaced while operating the equipment without extracting the board 4, thereby maintainability can be more improved. The lid 20 may be a door attached to the optical backplane 1.

Further, in the third embodiment, the electric connector 16 acting as the optical backplane connector may be divided into at least two components. Even in this arrangement, the photoelectric conversion module 6 can be accommodated in the electric connector 16.

Figure 14:
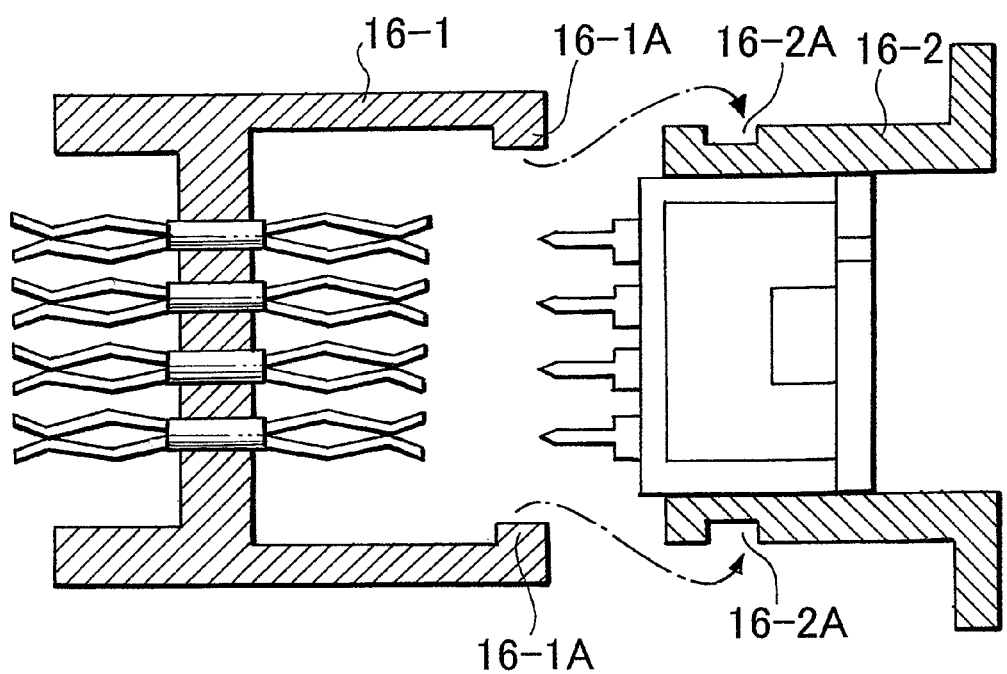
FIG. 14 is a sectional view of an electric connector.
Figure 15:
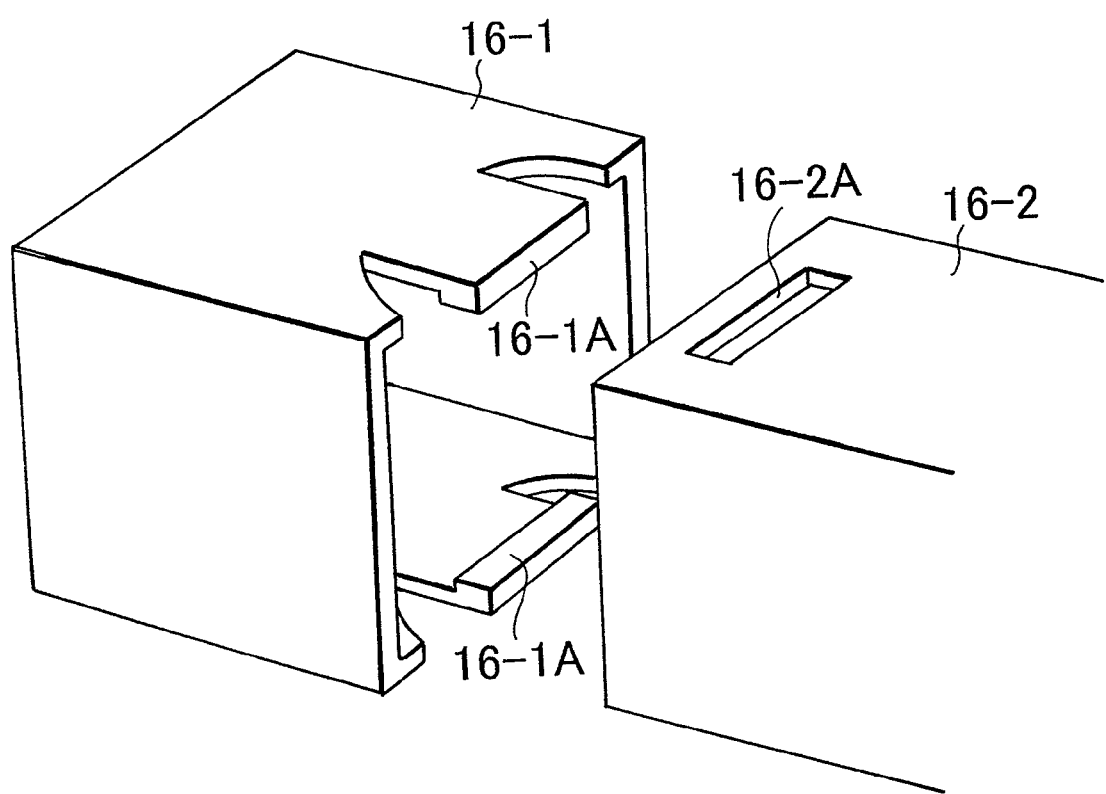
FIG. 15 is a sectional view of the electric connector.

FIG. 14 shows a sectional view of the electric connector 16, and FIG. 15 shows a perspective view of it. As shown in FIGS. 14 and 15, the electric connector 16 is made separable to two components 16-1 and 16-2, and after the photoelectric conversion module 6 is inserted into the component 16-2, the component 16-2 is inserted into the component 16-1 so that electric contacts of the component 16-1 are connected to electric contacts of the photoelectric conversion module 6. Otherwise, after the photoelectric conversion module 6 is inserted into the electric connector 16-1, the component 16-2 is inserted into the component 16-1. In this case, claw portions with convex portions (which are formed at two positions in this case) 16-1A are formed to an edge portion of the component 16-1, and concave portions 16-2A for receiving them are formed to the component 16-2, thereby the component 16-1 can be connected and fixed to the component 16-2. Otherwise, the component 16-2 can be also connected and fixed to the component 16-1 by forming the claw portions to the component 16-2 and forming the concave portions for receiving them to the component 16-1. Further, the component 16-1 may be inserted into the component 16-2, in place of that the component 16-2 is inserted into the component 16-1.

As described above, when the electric connector 16 is divided into the components 16-1 and 16-2, the photoelectric conversion module 6 can be replaced by removing the component 16-1 even in a state that the component 16-2 is fixed to the optical backplane 1.

In the respective arrangements of the third embodiment described above, the case that the overall photoelectric conversion module 6 is accommodated in the optical backplane connector has been explained. However, a part of the photoelectric conversion module 6 (for example, the light transmission substrate 22) may enter to the optical backplane side without being accommodated in the electric connector 16.

Further, in the third embodiment, the shape of the convex portion of the photoelectric conversion module 6 to be inserted into the concave portion of the electric connector 16 may be formed such that a convex portion of a part of the photoelectric conversion module 6 is inserted into apart of the concave portion. For example, the portion of the photoelectric conversion module 6, which is shown in FIG. 7 and includes the light transmission substrate 22, is formed so as to be inserted into a first concave portion 16A of the electric connector 16 and fitted thereinto. However, the portion having the electric contacts 21 may be formed smaller than a second concave portion 16B (concave portion located at the back of the first concave portion and smaller than the first concave portion) of the electric connector 16 so that it is not fitted to the second concave portion 16B (that is, the portion having the electric contacts 21 don't contact to the inside wall of the second concave portion 16B).

Further, in the third embodiment, the optical connector 3 may not be disposed so as to be in contact with the photoelectric conversion module 6. That is, after the photoelectric conversion module 6 is inserted into the electric connector 16, it may be closed by a lid with an opening or a door attached to the electric connector 16, and the optical connector 3 may be attached on the lid or on the door.

Further, in the third embodiment, it is sufficient that the photoelectric conversion module 6 be accommodated in the electric connector 16, and it is not always necessary to fit the photoelectric conversion module 6 to the concave portion of the electric connector 16. When reliability of connection can be sufficiently kept by the connection of, for example, the electric contacts 15 and 21, the photoelectric conversion module 6 need not have the convex shape to be inserted into the concave portion of the electric connector 16, and the photoelectric conversion module 6 need not come into contact with the inside wall of the concave portion of the electric connector 16.

Further, in FIGS. 7, 8, and 12, although the guide pin 10 or the fitting hole 18 and a light incoming and outgoing portion 24 are not disposed on a straight line, they may be disposed on the straight line. Further, the structure in which the electric contacts 21 are clamped by the electric contacts 15 is explained above, the electric contacts 15 may be clamped by the electric contacts 21 inversely.

In the embodiments, when a plurality of optical signals are received by a photoelectric conversion module on the circuit substrate in a juxtaposed state, or when a plurality of optical signals are output from a photoelectric conversion module on the circuit substrate in a juxtaposed state, the optical signals are received or output in nonparallel with the main surface of the circuit substrate (preferably at 45° to 135° and most preferably at about 90° to the main surface of the circuit substrate). Consequently, as compared with the case that optical signals are received or output in parallel with the main surface of the circuit substrate, the width of the photoelectric conversion modules can be reduced and thus the mounting density of the circuit substrate can be more increased. When optical signals are output from the circuit substrate through an optical connector connected to a photoelectric conversion module through a plurality of optical fibers, the disposing direction of the optical fibers of the optical connector is also made nonparallel with the main surface of the circuit substrate (preferably at 45° to 135° and most preferably at about 90° to the main surface of the circuit substrate). As a result, the width of the optical connectors can be reduced and the mounting density of the circuit substrate can be improved.

Further, the disposing direction of the optical fibers of the optical connectors of the optical backplane, which receive optical signals from the circuit substrate or output optical signals to the circuit substrate, is made in nonparallel with the main surface of the circuit substrate (preferably at 45° to 135° and most preferably at about 90° to the main surface of the circuit substrate). As a result, the mounting density of the optical backplane can be also improved by reducing the pitch between the optical connectors by less bending the optical fibers or reducing the number of times of bending thereof. In particular, when the optical fiber connectors on the optical backplane side are installed such that the disposing direction of the optical fibers is at about a right angle (about 90°) to the surface of the board, connector bypass portions, which are necessary in a conventional case in which a board is disposed in parallel with an optical fiber array, are made unnecessary, thereby a connect or pitch can be reduced. With this arrangement, the mounting density of the optical backplane can be increased.

Further, even in the case in which the photoelectric conversion module is inserted into the concave portion in the optical backplane connectors attached to the optical backplane, the optical signals from the photoelectric conversion modules are output in nonparallel with the main surface of the circuit substrate (preferably at 45° to 135° and most preferably at about 90° to the main surface of the circuit substrate). As a result, the mounting density of the optical backplane can be improved by reducing the pitch between the optical connectors by less bending the optical fibers or reducing the number of times of bending thereof.

Although the exemplary embodiments of the present invention have been described in detail, it should be understood that various changes, substitutions and alternatives can be made therein without departing from the spirit and scope of the invention as defined by the appended claims. Further, it is the inventor's intent to retain all equivalents of the claimed invention even if the claims are amended during prosecution.

What is claimed is:

1. Information processing equipment in which a first electric connector disposed on an optical backplane is electrically connected to a second electric connector disposed on a circuit substrate, the information processing equipment comprising:
   a photoelectric conversion module being accommodated in the first electric connector,
   the photoelectric conversion module including a plurality of juxtaposed light input and output ports;
   a plurality of juxtaposed optical fibers laid on the optical backplane;
   an optical connector being disposed to edge portions of the plurality of juxtaposed optical fibers,
   the optical connector accommodating edge portions of the plurality of juxtaposed optical fibers;
   an elastic body for pushing the optical connector toward the photoelectric conversion module; and
   a light path converter being included in the optical connector and being arranged between the photoelectric conversion module and the edge portions of the plurality of juxtaposed optical fibers, wherein
   the photoelectric conversion module is optically connected to the optical connector;
   the disposing direction of an array direction of the plurality of juxtaposed optical fibers in the optical connector is in nonparallel with the main surface of the circuit substrate;
   the disposing direction of a length direction of the plurality of juxtaposed optical fibers in the optical connector is in parallel with the main surface of the circuit substrate;
   the disposing direction of the light input and output ports of the photoelectric conversion module is in nonparallel with the main surface of the circuit substrate;
   the direction of insertion and extraction between the first electric connector and the second electric connector is perpendicular to the main surface of the optical backplane; and
   the first electric connector includes a surface being in a parallel with the main surface of the optical backplane, and the surface comprises electric contacts for connecting to the second electric connector, the electric contacts being electrically connected to the photoelectric conversion module.

2. The information processing equipment according to claim 1, wherein the first electric connector has an optical backplane attachment portion for attaching and detaching the first electric connector to/from the optical backplane.

3. The information processing equipment according to claim 2, wherein the optical backplane attachment portion has cutouts.

4. An optical backplane connector capable of being attached to an optical backplane, comprising:
   an optical backplane attachment portion for attaching and detaching the optical backplane connector to/from the optical backplane;
   a concave portion which can accommodate at least one photoelectric conversion module having a plurality of juxtaposed light input and output ports,
   the concave portion including first electric contacts connected to second electric contacts of the photoelectric conversion module; and
   a surface being in parallel with a main surface of the optical backplane and including third electric contacts for connecting to an electric connector, the third electric contacts being electrically connected to the first electric contacts, wherein
   the photoelectric conversion module can be inserted into the concave portion such that the disposing direction of the plurality of light input/output ports of the photoelectric conversion module is in nonparallel with the main surface of a circuit substrate attached to the optical backplane at about a right angle, the circuit substrate being electrically connected to the electric connector;
   the plurality of light input and output ports of the photoelectric conversation module are optically connected to an optical connector;
   the optical connector accommodates edge portions of a plurality of juxtaposed optical fibers;
   the disposing direction of an array direction of the plurality of juxtaposed optical fibers in the optical connector is in nonparallel with the main surface of the circuit substrate;
   the disposing direction of a length direction of the plurality of juxtaposed optical fibers in the optical connector is in parallel with the main surface of the circuit substrate.

5. The optical backplane connector according to claim 4, wherein the optical backplane attachment portion has cutouts.

6. A light transmission method comprising:
   outputting a plurality of juxtaposed optical signals from a photoelectric conversion module which is disposed in a first electric connector disposed on an optical backplane, the plurality of juxtaposed optical signals being in nonparallel with the main surface of a circuit substrate, the optical backplane being disposed at about a right angles to the circuit substrate; and
   receiving the plurality of juxtaposed optical signals by an optical connector which is disposed on the optical backplane, wherein
   the optical connector accommodates edge portions of a plurality of juxtaposed optical fibers;
   the disposing direction of an array direction of the plurality of juxtaposed optical fibers in the optical connector is in nonparallel with the main surface of the circuit substrate;
   the disposing direction of a length direction of the plurality of juxtaposed optical fibers in the optical connector is in parallel with the main surface of the circuit substrate;
   the first electric connector is electrically connected to a second electric connector disposed on the circuit substrate;
   the direction of insertion and extraction between the first electric connector and the second electric connector is perpendicular to the main surface of the optical backplane;
   the first electric connector includes a surface being in parallel with the main surface of the optical backplane, and the surface comprises electric contacts for connecting to the second electric connector, the electric contacts being electrically connected to the photoelectric conversion module;

an elastic body pushes the optical connector toward the photoelectric conversion module; and a light path converter is included in the optical connector and arranged between the photoelectric conversion module and the edge portions of the plurality of juxtaposed optical fibers.

7. A light transmission method comprising:

outputting a plurality of juxtaposed optical signals from an optical connector which is disposed on an optical backplane disposed at about right angles to a circuit substrate, the plurality of juxtaposed optical signals being in nonparallel with the main surface of the circuit substrate; and receiving the plurality of juxtaposed optical signals by a photoelectric conversion module which is disposed in a first electric connector disposed on the optical backplane, wherein the optical connector accommodates edge portions of a plurality of juxtaposed optical fibers;

the disposing direction of an array direction of the plurality of juxtaposed optical fibers in the optical connector is in nonparallel with the main surface of the circuit substrate;

the disposing direction of a length direction of the plurality of juxtaposed optical fibers in the optical connector is in parallel with the main surface of the circuit substrate;

the first electric connector is electrically connected to a second electric connector disposed on the circuit substrate;

the direction of insertion and extraction between the first electric connector and the second electric connector is perpendicular to the main surface of the optical backplane;

the first electric connector includes a surface being in parallel with the main surface of the optical backplane, and the surface comprises electric contacts for connecting to the second electric connector, the electric contacts being electrically connected to the photoelectric conversion module;

an elastic body pushes the optical connector toward the photoelectric conversion module; and a light path converter is included in the optical connector and arranged between the photoelectric conversion module and the edge portions of the plurality of juxtaposed optical fibers.

* * * * *